United States Patent
Sleman

(10) Patent No.: US 12,403,410 B2
(45) Date of Patent: Sep. 2, 2025

(54) HYDROCHROMIC BUILDING ELEMENTS AND METHODS OF USE

(71) Applicant: Matthew Sleman, Monroe, NJ (US)

(72) Inventor: Matthew Sleman, Monroe, NJ (US)

( * ) Notice: Subject to any disclaimer, the term of this patent is extended or adjusted under 35 U.S.C. 154(b) by 0 days.

(21) Appl. No.: 18/979,606

(22) Filed: Dec. 13, 2024

(65) Prior Publication Data
US 2025/0108314 A1 Apr. 3, 2025

Related U.S. Application Data

(63) Continuation of application No. 18/313,328, filed on May 6, 2023, now Pat. No. 12,201,919, which is a continuation of application No. 17/681,813, filed on Feb. 27, 2022, now Pat. No. 11,642,606.

(51) Int. Cl.
| A63H 33/22 | (2006.01) |
| A63H 3/16 | (2006.01) |
| A63H 9/00 | (2006.01) |
| A63H 33/08 | (2006.01) |
| C09D 11/50 | (2014.01) |

(52) U.S. Cl.
CPC ........... *A63H 33/22* (2013.01); *A63H 33/086* (2013.01); *C09D 11/50* (2013.01); *A63H 3/16* (2013.01); *A63H 9/00* (2013.01); *Y10T 29/4978* (2015.01); *Y10T 29/4998* (2015.01)

(58) Field of Classification Search
CPC ........ A63H 33/22; A63H 33/086; A63H 3/16; A63H 9/00; C09D 11/50; Y10T 29/4978
See application file for complete search history.

(56) References Cited

U.S. PATENT DOCUMENTS

| | | | | |
|---|---|---|---|---|
| 2,921,407 A * | 1/1960 | Wagner | ..................... | A63H 3/36 446/385 |
| 4,257,188 A * | 3/1981 | Barker | ................... | A63H 3/001 446/305 |
| 5,503,583 A * | 4/1996 | Hippely | ................. | A63H 33/22 446/337 |
| 8,864,546 B1 * | 10/2014 | Capriola | .............. | A63H 33/042 446/124 |
| 8,894,463 B2 * | 11/2014 | Chan | ........................ | A63H 3/00 446/72 |
| 9,681,468 B2 * | 6/2017 | Lee | ......................... | H04W 4/70 |
| 10,427,065 B2 * | 10/2019 | Murthy | ................ | A63H 33/086 |
| 11,498,014 B1 * | 11/2022 | Aalund | ................... | A63H 33/26 |
| 2010/0001923 A1 * | 1/2010 | Zilber | ................. | A63F 3/00643 345/1.1 |
| 2012/0276804 A1 * | 11/2012 | McKenna | ................ | A63H 3/16 382/190 |
| 2018/0178578 A1 * | 6/2018 | Tierney | ................ | B42D 25/378 |
| 2021/0260495 A1 * | 8/2021 | Seder | ..................... | G03B 25/02 |

* cited by examiner

Primary Examiner — Jason L Vaughan

(57) ABSTRACT

Embodiments of the present disclosure may include a method including assembling at least two building elements together. Embodiments may also include applying a stimulus to at least one of the at least two building elements, the stimulus being capable of changing a characteristic of at least a portion of the one of the at least two building elements. In some embodiments, the at least two building elements may be assembled together prior to applying the stimulus.

18 Claims, 5 Drawing Sheets

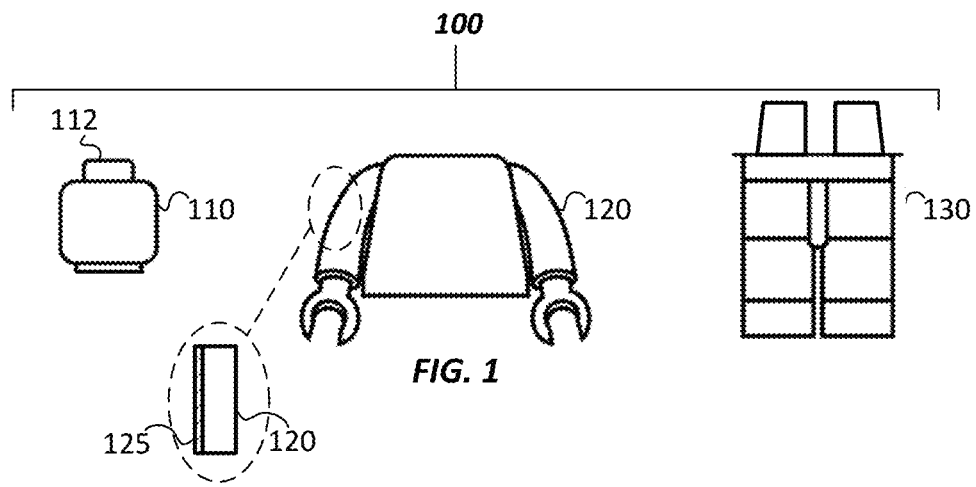
FIG. 1
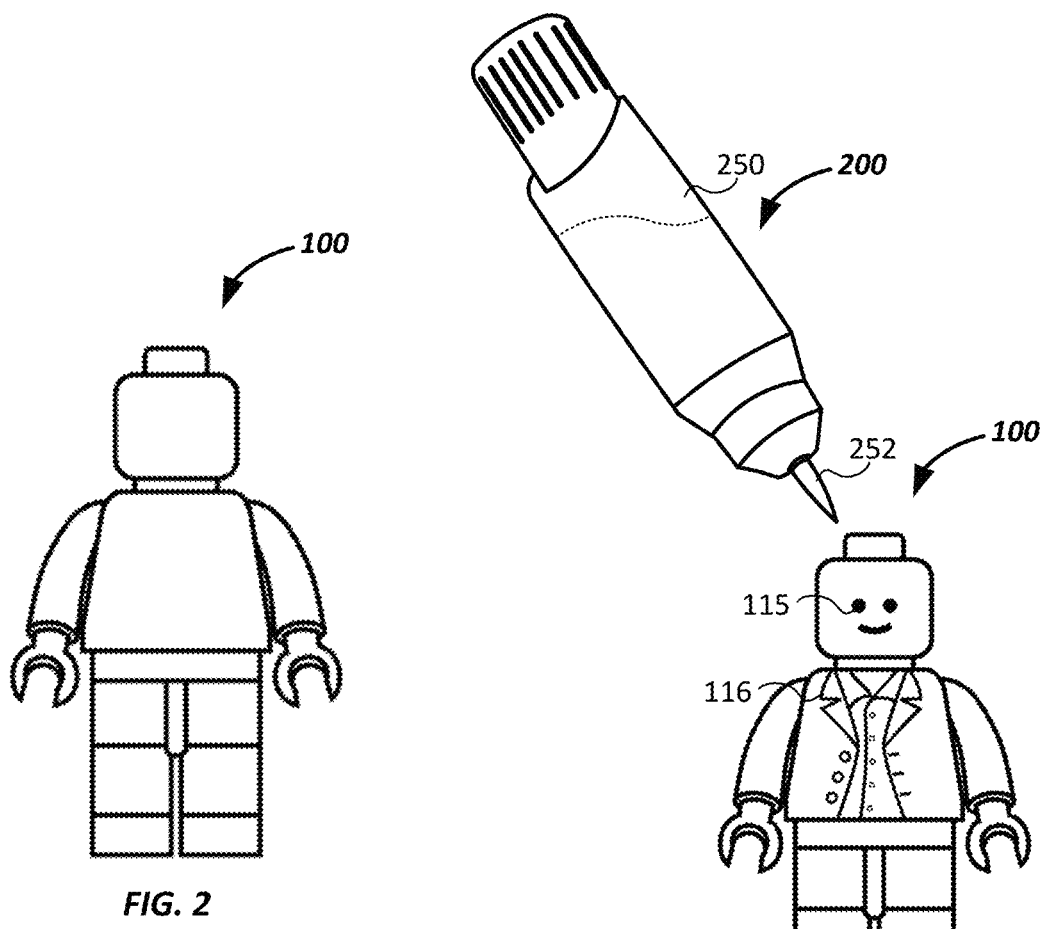
FIG. 2
FIG. 3

HYDROCHROMIC BUILDING ELEMENTS AND METHODS OF USE

CROSS-REFERENCE TO RELATED APPLICATIONS

This application is a continuation of U.S. application Ser. No. 18/313,328, filed May 6, 2023, which is a continuation of U.S. application Ser. No. 17/681,813, filed Feb. 27, 2022, now U.S. Pat. No. 11,642,606, the contents of which is hereby incorporated by reference as if fully set forth herein.

FIELD OF THE DISCLOSURE

The present disclosure relates to toy building elements and more particularly to hydrochromic toy building bricks or blocks adapted to be connected together by means of projections and recesses or similar coupling features.

BACKGROUND OF THE DISCLOSURE

Interlocking building blocks are beloved by children and adults everywhere. Toys of this type generally include a number of building bricks that can be fastened together in various orientations and configurations to create vehicles, buildings, robots and the like. The building bricks are typically fastened or clamped together through the use of projections and recesses. U.S. Pat. No. 3,005,282 to G. K. Christiansen disclosed a basic arrangement of these building blocks, universally recognized and sold under the registered trademark LEGO®. The franchise has spawned thousands of building sets and themes, and in recent years has led to the creation of theme parks and movies.

SUMMARY OF THE DISCLOSURE

Embodiments of the present disclosure may include a method including assembling at least two building elements together. Embodiments may also include applying a stimulus to at least one of the at least two building elements, the stimulus being capable of changing a characteristic of at least a portion of the one of the at least two building elements. In some embodiments, the at least two building elements may be assembled together prior to applying the stimulus.

In some embodiments, the at least two building elements may be assembled together after applying the stimulus. Embodiments may also include applying a stimulus to at least one of the at least two building elements may include exposing a hydrochromic building element to water. Embodiments may also include applying a stimulus to at least one of the at least two building elements may include brushing the at least two building elements with the water.

Embodiments may also include applying a stimulus to at least one of the at least two building elements may include submerging the at least two building elements in the water. Embodiments may also include applying a stimulus to at least one of the at least two building elements may include exposing the building element to heat. Embodiments may also include applying a stimulus to at least one of the at least two building elements may include applying a stimulus to only one of the at least two building elements. Embodiments may also include applying a stimulus to at least one of the at least two building elements may include applying a stimulus to all of the at least two building elements.

Embodiments of the present disclosure may also include a method of ensuring proper assembly of a toy, including assembling at least two building elements together. Embodiments may also include confirming proper assembly of the at least two building elements by applying a stimulus to at least one of the at least two building elements, the stimulus being capable of changing a color of at least a portion of the at least one building element to indicate proper assembly.

In some embodiments, the at least two building elements may be assembled together prior to applying the stimulus. In some embodiments, confirming proper assembly may include verifying that the at least two building elements belong together by having a same color. In some embodiments, the at least two building elements may be assembled together after applying the stimulus. In some embodiments, confirming proper assembly may include verifying that the least two building elements belong together by having complementary colors.

In some embodiments, the method may include detecting a misplaced building element by applying the stimulus and identifying that the misplaced building element has an improper color. Embodiments may also include detecting a misplaced building element may include detecting that the misplaced building element has a color that may be different from those of adjacent building elements.

Embodiments of the present disclosure may also include a method of conducting a sweepstakes, including assembling at least two building elements together. Embodiments may also include applying a stimulus to at least one of the at least two building elements, the stimulus being capable of changing a color of at least a portion of the at least one building element. Embodiments may also include identifying a unique building element as a winning element via the stimulus.

In some embodiments, the at least two building elements may be assembled together prior to applying the stimulus. In some embodiments, the at least two building elements may be assembled together after applying the stimulus. In some embodiments, the winning element may be a gold-colored element that may be only observable after exposure to the stimulus. In some embodiments, the stimulus may include exposure to water. Embodiments may also include identifying a unique building element as a winning element may include making a QR code visible on the unique building element.

BRIEF DESCRIPTION OF THE DISCLOSURE

Various embodiments of the presently disclosed building elements are shown herein with reference to the drawings, wherein:

FIG. 1 illustrates certain character building elements having hydrochromic coatings;

FIG. 2 illustrates an assembled character prior to exposure to water;

FIG. 3 illustrates the assembled character after exposure to water;

Figure 5A:
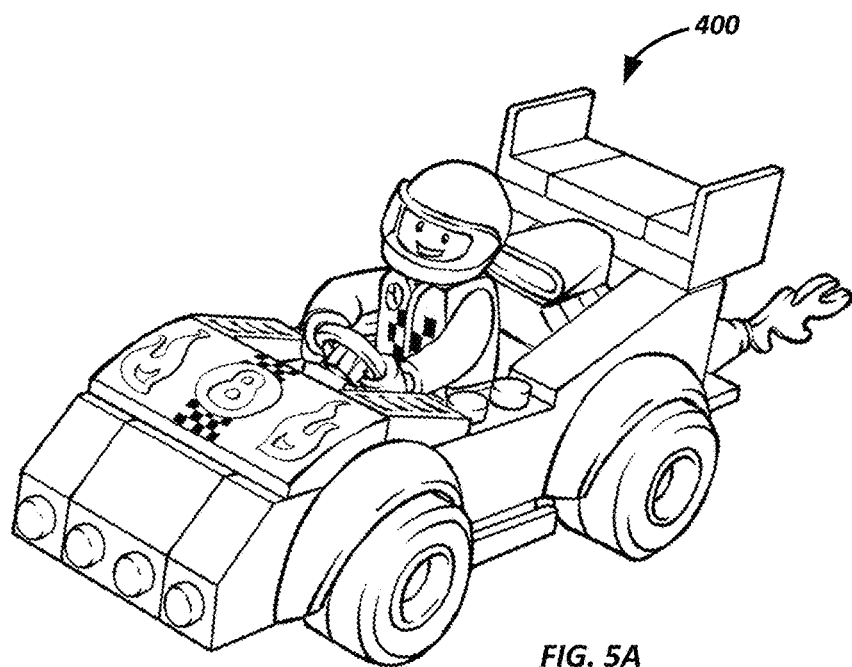
Figure 5B:
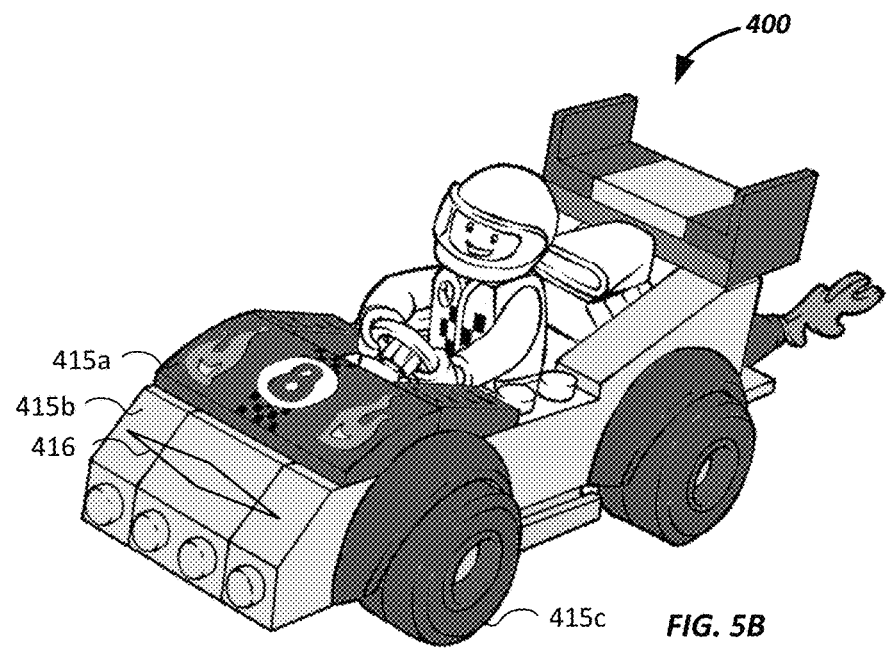
Figure 6A:
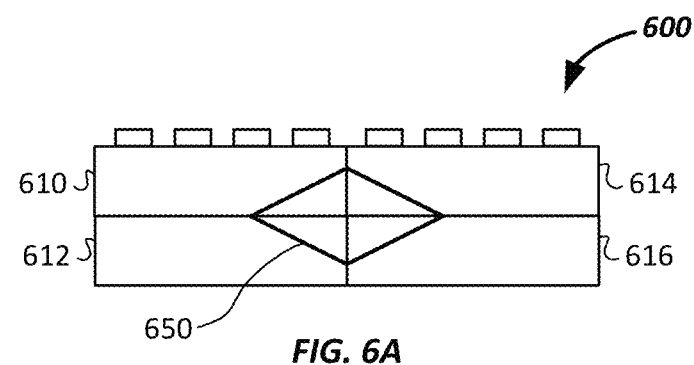
Figure 6B:
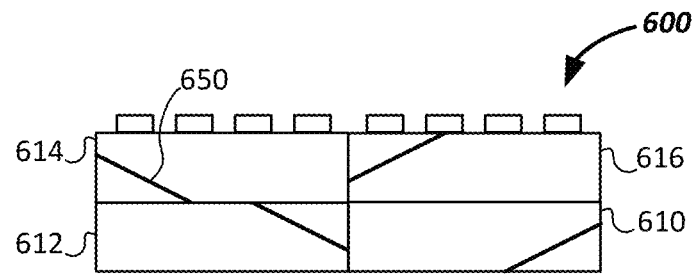
Figure 7:
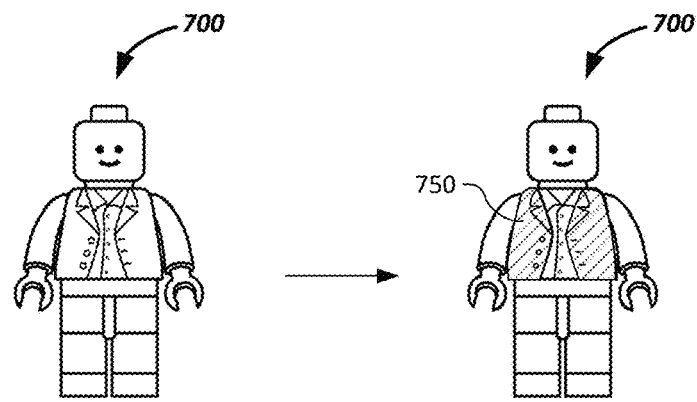
Figure 8:
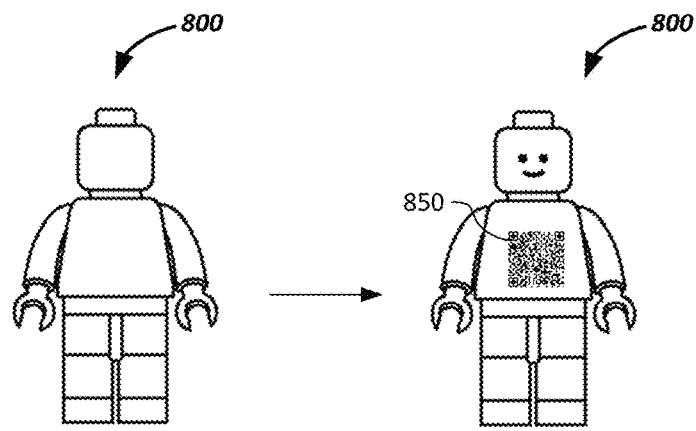
Figure 9:
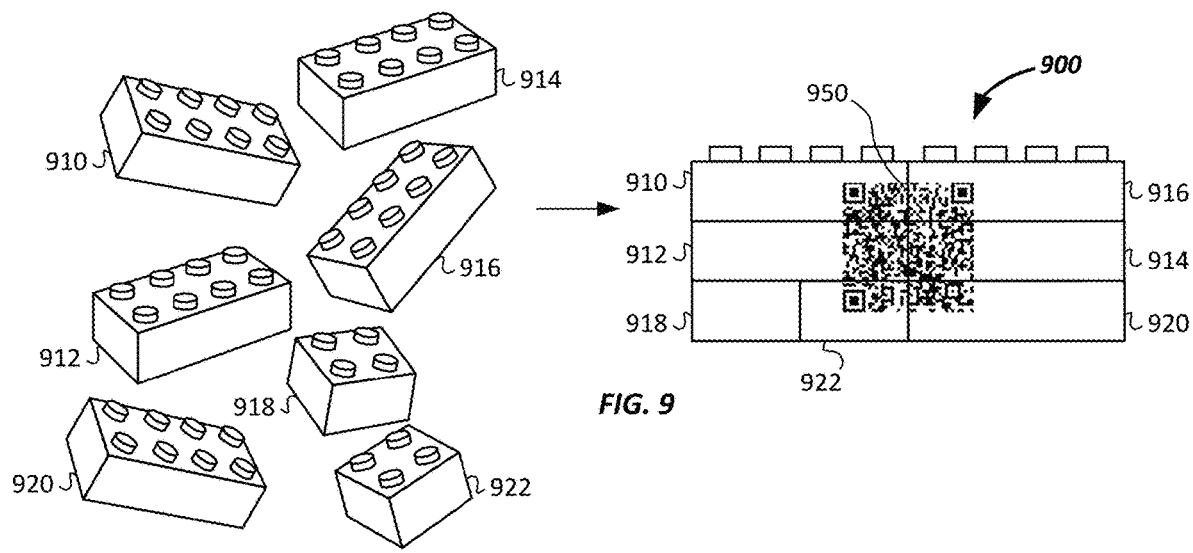

FIGS. 5A-B illustrate an assembled vehicle prior to, and after exposure to water;

FIGS. 6A-B illustrate an assembled subunit after exposure to water in a correct configuration and an incorrect configuration;

FIG. 7 illustrates the transition of an assembled character prior to, and after, exposure to water according to one embodiment;

FIG. 8 illustrates the transition of an assembled character prior to, and after, exposure to water according to another embodiment; and FIG. 9 illustrates the transition of an assembled subunit prior to, and after, assembly and exposure to water according to another embodiment.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to building elements and their methods of use, conventional devices may be improved in several ways.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

As used herein, the phrases "coupled to" and "in communication with" refer to any form of interaction between two or more entities, including mechanical, electrical, magnetic, electromagnetic, fluid, and/or thermal interaction. Two components may be coupled to or in communication with each other even though they are not in direct contact with each other. For example, two components may be coupled to, or in communication with, each other directly (i.e., the two components touch either other) or through an intermediate component.

As used herein, the terms "building element" may include traditional building blocks in the shape of a rectangular prism or bricks with coupling projections and/or recesses. Other building elements may include only projections, only recesses, or neither (i.e., they may be coupled or coupleable to other components indirectly through the coupling of other elements). In addition to these traditional blocks, "building element" may also refer to non-brick components, such as those used to create figurines, often referred to as "minifigures." It is contemplated that "building element" may also include relatively flat interlocking or coupling elements, such as those of a jigsaw, floor puzzle, or tiling puzzle. The building elements may comprise plastic, metal, wood, cardboard, paper and/or biodegradable materials (e.g., vegetable meal-based polymers that have been formed into a resin).

FIG. 1 illustrates various building elements that, when assembled, form a toy character. In this example, the character 100 includes three building elements: a head 110, a torso 120 and legs 130. Any of these building elements may have one or more projections and/or recesses to enable them to mate with other building elements. For examples, head 110 includes a prominent cylindrical projection or prong 112 that allows the user to couple accessories, such as hats, helmets or the like to the top of head 110.

As shown in the detailed view of FIG. 1, one or more of the building elements may have an outermost transitionable layer 125 that undergoes a change, alteration or transformation, visible or invisible to the user, upon the application of an external stimulus or a passage of time. In some examples, the transitionable layer 125 is a hydrochromic layer that changes color, or allow a color to appear, when exposed to a liquid or moisture, such as exposure to water. The hydrochromic layer can, for example, be hidden and change into a color after the application of water. The hydrochromic layer may include an upper layer and a lower painted layer, the upper layer being transitionable between an opaque configuration when dry, and a transparent configuration when wet that allows the lower layer with its detail to be seen. This transition can be reversible or irreversible.

In some examples, a water-based screen ink may be used which dries opaque (e.g., white), but becomes transparent when wet, making print or text visible underneath it. In this manner, a lower layer of a building element can have an alterable opacity, and text, images, symbols, color or other elements may be made visible or invisible depending on the intended usage. Hydrochromic ink can be applied directly to a building element (e.g., screen printed or painted on). Alternatively, a label or sticker having the hydrochromic element may be adhered to one or more surfaces of the building element. The external stimulus need not be a liquid. For example, photochromic inks are also possible, which react to UV and/or sunlight, and the transitionable layer 125 may include a photochromic element. Thermochromic or heat-sensitive layers are also possible, which transition under the application of heat at a predetermined temperature.

Figure 4:
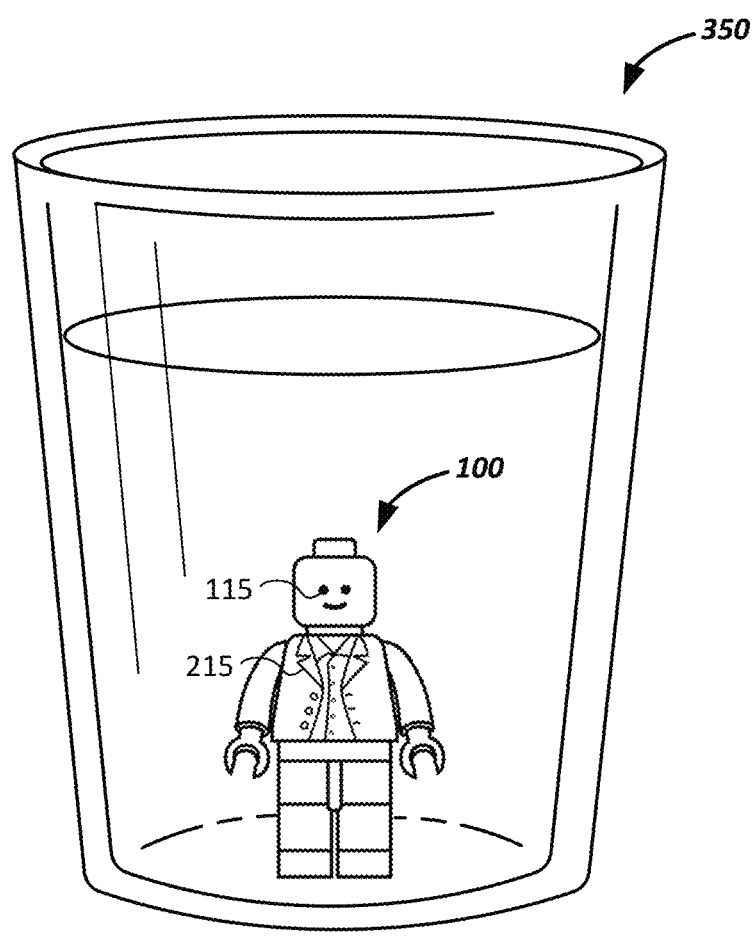
FIG. 4 illustrates an assembled character being submerged in water.

FIGS. 2-3 illustrate an assembled character 100 prior to exposure to water. A liquid-filled brush 200 may be used as the stimulus to transition the assembled character 100 from a first condition to a second condition. Specifically, brush 200 may include a fillable reservoir 250 and a moisture-applicating tip 252 that will be used to "color" the character. In this example, the brush 200 is used to expose the character's facial features 115, which were previously invisible prior to the stimulus. Additionally, garment details 116, which were previously invisible prior to the stimulus can now be seen. These may include the jacket shown, or other accessories. It will be understood that these details may be simple black lines that appear upon the application of the stimulus. Because of this, the player may feel satisfaction in assembling a character and then gain an additional reward of being surprised by the appearance of some feature or some transition of the character after the application of the stimulus. In this manner, the assembled character becomes more dynamic and interesting than a traditional "static" toy. Instead of using a brush, the assembled character may be submerged in a glass of water 350 or bath to achieve the same or a similar effect of revealing details 115, 116 as shown in FIG. 4.

FIGS. 5A-B illustrate an assembled vehicle 400 prior to, and after, exposure to a stimulus. In this example, all the details were previously visible to the user, but exposure to the stimulus allows a plurality of different colors 415a-c to be visible to the user. It will be understood that the stimulus (e.g., water) may be applied to all or selected ones of the building elements. Additionally, it will be understood that the stimulus may be applied after full assembly of the character or toy, or may be applied prior to assembly. For example, the user may begin by applying the stimulus to the unassembled building units, and the exposure to the stimulus may reveal information, logos, codes, text, numbers, symbols, colors and/or patterns to the user to help them assemble the unit or subunit. In one example, the user may apply a stimulus to reveal that some of the pieces are similarly colored, and the user may understand that those pieces fit together (e.g., all the elements that transitioned to red fit together to form a first subunit and all the elements that transitioned to blue fit together to form a second subunit). In another example, the user may apply a stimulus to reveal a pattern 416 or a numbering system to assist in assembly. In this manner, hidden information may be embedded in the building unit that are revealed to aid the user to assemble the toy, and the information may become hidden after the stimulus is removed (e.g., after the character dries). Alternatively, a company logo may appear when exposed to the stimulus and this may serve as a "watermark" to authenticate a toy as genuine.

FIGS. 6A-B illustrate how the hidden information may also be used to confirm proper assembly of a unit or subunit. For example, the user may expose the assembled character or toy to water to reveal information, logos, codes, text, numbers, symbols, outlines or images of characters, animals, set themes, colors and/or patterns to confirm proper assembly. In one example, a unique pattern 650 that extends across multiple building elements may be revealed after exposure to the stimulus and this unique pattern extending uninterrupted over edges of the distinct building elements may confirm proper assembly. In the example shown in FIG. 6A, a diamond-shaped pattern 650 may emerge after application of a stimulus to show that building elements 610-616 are properly assembled. Conversely, if the four elements 610-616 are assembled in a different fashion (FIG. 6B), the pattern 650 is not possible or is interrupted, which shows that the assembly was incorrect. Note that this example is shared only to illustrate the general concept—the four building 610-616 elements are traditional 2×4 blocks and are interchangeable so there may not be a proper or improper assembled configuration (e.g., any combination will result in the same subunit). However, in more complex assemblies, subtle variations between building elements may result in toys or units that are improperly assembled, and the hidden pattern 650 may confirm proper assembly after the application of a stimulus, and may disappear thereafter. This may be especially useful in highly complex assemblies where the verification step can be performed during the assembly process (e.g., after building one or more subunits), which would prevent the user from making a simple mistake in one subunit that compounds or that requires disassembly of multiple subunits. In addition to pattern 650, complementary colors may be used to verify proper assembly. The converse is also true in that a pattern, color or other information may be used to identify a misplaced building element (e.g., an element that belongs to a different toy or set, or an element that is misplaced or incorrectly interchanged with another). For example, a subunit may include only bricks that transition to red and identifying a brick that transition to blue may indicate misplacement or improper assembly.

FIG. 7 illustrates the transition of an assembled character 700 prior to, and after, exposure to water. In this example, the character's jacket 750 has transitioned to a different color after exposure to the stimulus. This example may be used in a sweepstakes. For example, a number of similarly-appearing characters 700 may be sold and the user may assemble the character and apply the stimulus (before or after assembly) to discover a hidden feature or message showing that they have won a prize or sweepstakes. For example, the user may discover that their character is unique in having a gold jacket after exposure to the stimulus and this unique gold jacket character may be returned or presented to a retailer or manufacturer to claim a prize. Instead of a gold jacket, a trophy, diamond or other image may appear on the assembled toy to signal that a prize has been won.

In the example shown in FIG. 8, one or more hidden QR codes 850 or other scannable barcodes or similar elements may appear on a character 800 or toy after the application of a stimulus, and the QR codes 850 may be scanned by the user's mobile phone and redirect them to a webpage showing that they have won a prize. Alternatively, the QR code 850 may be used in combination with a mobile application to add the character to a virtual collection or to show the extent to which a collection has been completed. In some examples, each character may have their own unique QR code. The virtual representations of the character (or avatar) may also be shared with other users. In some examples, two characters' QR codes may be scanned in succession (i.e., with the same or different mobile phones) and the two characters may be made to battle or otherwise interact with each other within an app. After interacting, each virtual representation or avatar of the character may be awarded points based on the outcome of the battle or interaction. A QR code 850 may also redirect the user to an assembly or instruction booklet to help them assemble a toy. In this manner, the need for paper instruction booklets may be reduced or eliminated without altering the look of the assembled toy. Additionally, the instruction booklet is never lost.

A QR code 950 may be broken and span across multiple building elements 910-922, as shown in FIG. 9, so that scanning of the code is only possible after assembly of a unit or subunit, which confirms that the unit has been assembled as intended. This code may be invisible to the user until the application of a stimulus, and may disappear after the effects of the stimulus are removed. Here again, a reward may be given to the user for proper assembly or a sweepstakes may be implemented to present a prize to a random user that has purchased a winning set. In some examples, a number of skill points are awarded to the user after scanning an assembled set, the skill points being proportional to the difficulty level of the assembled toy or set. A database or webpage having records of accounts may document user information and their activities and display the all-time cumulative score for each user. Additionally, the database may record the first user to assemble a given toy, and that user may be awarded a bonus for being the first to properly assemble a toy. Winners or leaders, either real names or usernames, may be shown on a website or application to the community.

Although the invention herein has been described with reference to particular embodiments, such as three-dimensional building blocks or hydrochromic elements, it is to be understood that these embodiments are merely illustrative of the principles and applications of the present invention. It is therefore to be understood that numerous modifications may be made to the illustrative embodiments and that other arrangements may be devised, including making any of these features or elements optional, without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations are made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially perpendicular" is recited with respect to a feature, it is understood that in further embodiments, the feature can have a precisely perpendicular configuration.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

I claim:

1. A method comprising:
   providing at least two building elements, each of the at least two building elements bearing a portion of a QR code;
   assembling the at least two building elements together so that a complete QR code is formed, the complete QR code forming a valid address only when the at least two building elements are assembled in a predetermined configuration; and
   scanning the complete QR code to access a webpage.

2. The method of claim 1, further comprising the steps of concealing the portions of the QR code prior to assembly, and revealing the portions of the QR code after assembly.

3. The method of claim 2, wherein revealing the portions of the QR code comprises applying a stimulus to the at least two building elements to reveal the QR code.

4. The method of claim 3, wherein the stimulus is water.

5. The method of claim 1, further comprising the step of providing a user with a reward for assembling the at least two building elements in the predetermined configuration.

6. The method of claim 5, wherein the reward is provided by accessing the webpage.

7. The method of claim 1, further comprising the step of entering a user into a sweepstakes after confirming that the user has properly assembled the at least two building elements in the predetermined configuration.

8. The method of claim 1, further comprising the step of awarding a user a number of skill points after confirming that the user has properly assembled the at least two building elements in the predetermined configuration.

9. The method of claim 8, wherein the skill points are proportional to a difficulty level of assembly of the predetermined configuration.

10. The method of claim 1, further comprising the step of creating a user-specific profile that documents user activity.

11. The method of claim 10, wherein the user activity includes information on a number of assembled toy sets.

12. The method of claim 10, wherein the user activity includes a cumulative user score that integrates a plurality of skill points.

13. The method of claim 12, further comprising the step of displaying a leaderboard based on the cumulative user score on the webpage.

14. The method of claim 12, further comprising the step of rewarding the first user with a prize or bonus.

15. The method of claim 10, further comprising the step of tracking a first user to achieve proper assembly of the predetermined configuration.

16. The method of claim 1, further comprising the step of providing a random user with a reward after scanning the complete QR code.

17. The method of claim 1, further comprising the step of providing a first user with a reward after scanning the complete QR code.

18. A method of assembling a toy product, comprising:
   providing at least two building elements, each of the at least two building elements bearing an incomplete portion of a QR code;
   assembling the at least two building elements together so that a complete QR code is formed, the complete QR code forming a valid address only when the at least two building elements are assembled in a predetermined configuration, and the complete QR code being unique to the toy product;
   scanning the complete QR code to access a webpage; and
   storing, in a virtual collection, a virtual representation of the toy product in a user profile after the complete QR code has been scanned.

* * * * *